United States Patent [19]

Joland

[11] Patent Number: 5,412,949
[45] Date of Patent: May 9, 1995

[54] FUEL-DISTRIBUTION SYSTEM FOR A GAS TURBINE ENGINE

[75] Inventor: Patrick R. D. Joland, Evry-Cregy SUR Yerres, France

[73] Assignee: Societe Nationale D'Etude et de Construction de Moteurs D'Aviation S.N.E.C.M.A., Paris, France

[21] Appl. No.: 310,703

[22] Filed: Sep. 22, 1994

[30] Foreign Application Priority Data

Sep. 29, 1993 [FR] France ............... 93 11525

[51] Int. Cl.⁶ .............................................. F02C 7/228
[52] U.S. Cl. .......................................... 60/739; 137/38
[58] Field of Search ................ 60/734, 739, 740, 741; 137/38, 42, 118, 883; 244/135 R, 135 C

[56] References Cited

U.S. PATENT DOCUMENTS

| | | |
|---|---|---|
| 2,599,680 | 6/1952 | Weeks . |
| 2,676,461 | 4/1954 | Gove ............................ 60/739 |
| 2,795,106 | 6/1957 | Martin ........................... 60/739 |
| 2,806,354 | 9/1957 | Cook ............................. 60/739 |
| 2,936,028 | 5/1960 | Gatzemeyer . |
| 3,249,145 | 5/1966 | Alberani et al. ................ 137/38 |
| 3,348,560 | 10/1967 | Stearns ......................... 137/38 |
| 3,738,104 | 6/1973 | Rosa . |
| 3,774,851 | 11/1973 | Simmons ....................... 60/739 |

FOREIGN PATENT DOCUMENTS 2134184 8/1984 United Kingdom .

Primary Examiner—Louis J. Casaregola
Attorney, Agent, or Firm—Bacon & Thomas

[57] ABSTRACT

A fuel distribution system for a gas-turbine engine is disclosed which ensures homogenous fuel supply to all fuel injectors in order to avoid local fuel oversupplies that might cause local overheating of the turbine blades. The fuel system compensates for the deleterious load factors experienced by the aircraft and the gas turbine engine that affect the fuel distribution to the fuel injectors. The system supplies fuel to a plurality of fuel injectors arranged in an annular array so as to inject fuel into an annular combustion chamber of the gas turbine engine. The system has a closed loop, generally annular fuel connector line and a plurality of fuel distributors connected in parallel to the fuel connector line so that fuel passes into a central chamber of each of the distributors. Each fuel distributor has end chambers on opposite ends of the central chamber in which are movably located pistons whose positions within the end chambers open or close a fuel outlet in communication with each of the end chambers. Each fuel injector is connected to one fuel outlet of a pair of fuel distributors. Also, the two fuel outlets of each fuel distributor are connected to different fuel injectors. The fuel distributor is oriented such that central axis of the central and end chambers extends substantially parallel to a line drawn between the ends of the fuel injectors served by that fuel distributor.

6 Claims, 3 Drawing Sheets

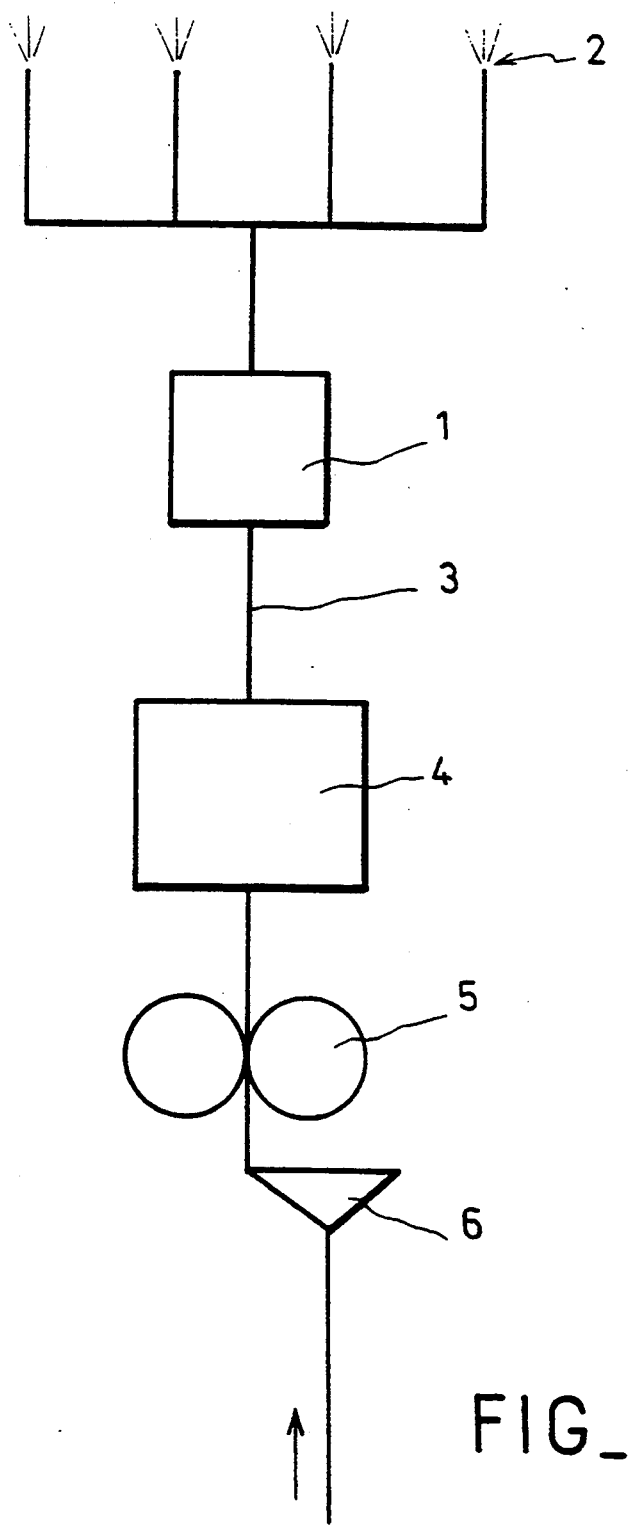
FIG_1

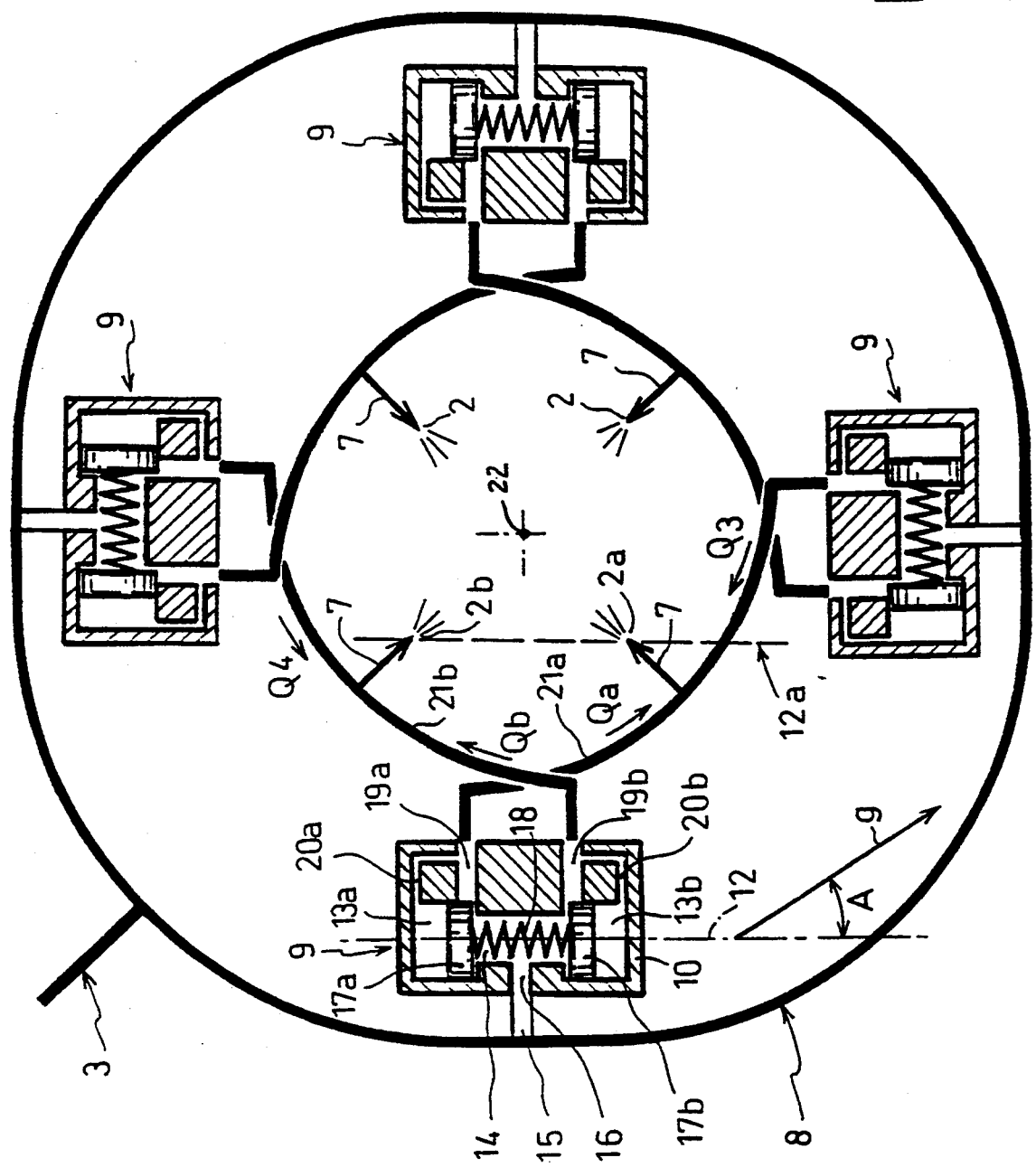
FIG_2

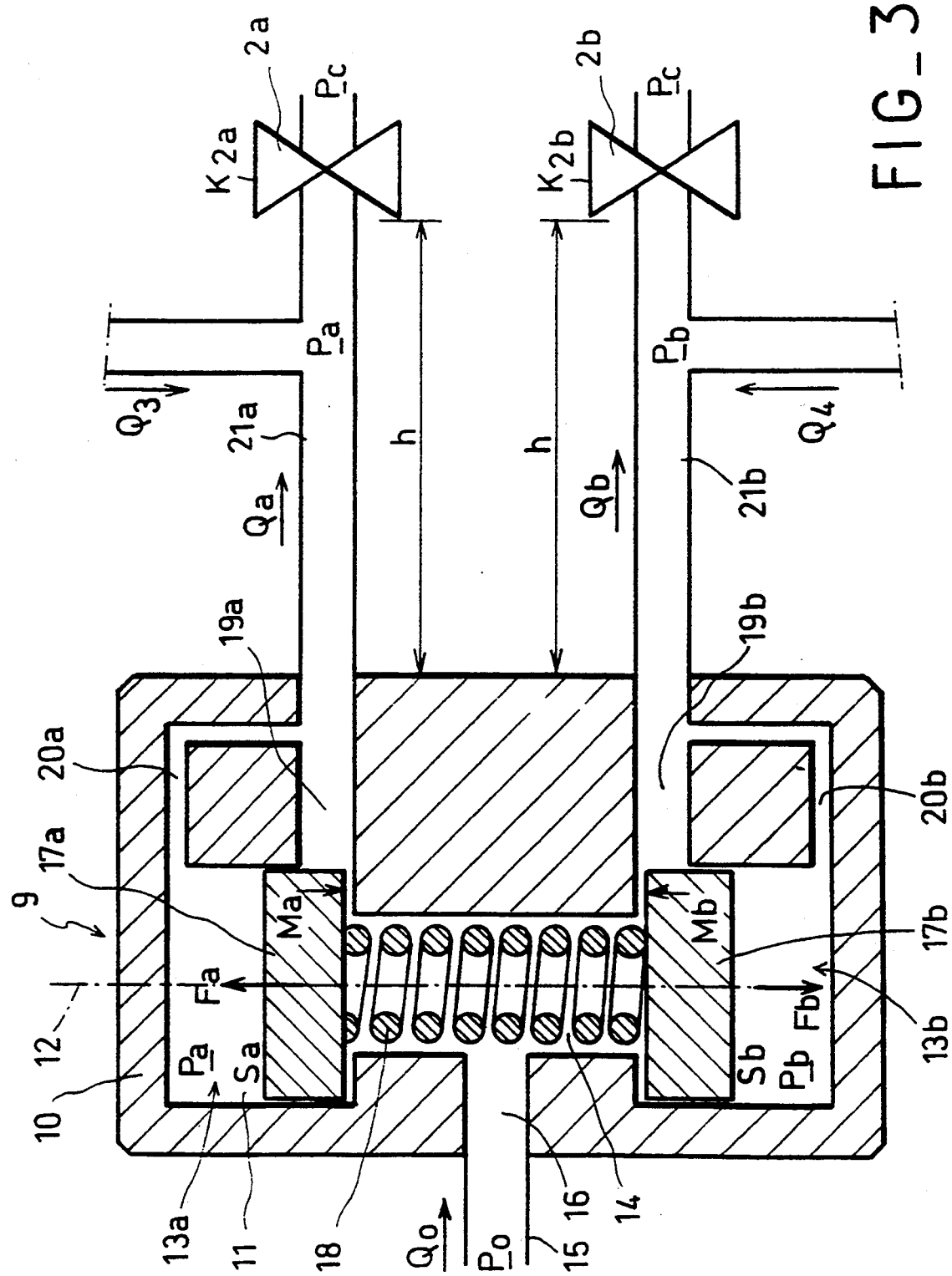
FIG_3

FUEL-DISTRIBUTION SYSTEM FOR A GAS TURBINE ENGINE

BACKGROUND OF THE INVENTION

The present invention relates to a fuel distribution system for a gas turbine engine, more particularly such an engine having aircraft applications.

Whether civilian or military, aircraft in flight must undergo diverse movements during all of the flight stages, namely takeoffs, landings, turns and, for combat aircraft, acrobatic maneuvers. Such movements during the flight of the aircraft occur about the yaw, roll and pitch axes.

On account of these motions, the aircraft, as well as the engine and associated equipment undergo accelerations in various directions, which accelerations induce load factors onto the aircraft and engine structures. Such load factors cause discrepancies in the fuel injection pressures of the gas-turbine engine injectors, thereby causing a heterogeneity in the output of the plurality of fuel injectors caused as a function of their locations in the engine.

To alleviate this problem, it is known to supply each fuel injector separately from a separate gear pump. When the gear pumps are driven by a common drive system, all of the fuel injectors are supplied with the same fuel flow. Typical systems can be found in U.S. Pat. Nos. 3,378,104; 2,936,028; and 2,599,680. While such systems function adequately, they require an unduly complex fuel supply system which is inherently subject to many malfunctions.

SUMMARY OF THE INVENTION

A fuel distribution system for a gas-turbine engine is disclosed which ensures homogenous fuel supply to all fuel injectors in order to avoid local fuel oversupplies that might cause local overheating of the turbine blades. The fuel system compensates for the deleterious load factors experienced by the aircraft and the gas turbine engine that affect the fuel distribution to the fuel injectors.

The system supplies fuel to a plurality of fuel injectors arranged in an annular array so as to inject fuel into an annular combustion chamber of the gas turbine engine. The system has a closed loop, generally annular, fuel connector line and a plurality of fuel distributors connected in parallel to the fuel connector line so that fuel passes into a central chamber of each of the distributors. Each fuel distributor has end chambers on opposite ends of the central chamber in which are movably located pistons whose positions within the end chambers open or close a fuel outlet in communication with each of the end chambers. Each fuel injector is connected to one fuel outlet of a pair of fuel distributors. Also, the two fuel outlets of each fuel distributor are connected to different fuel injectors. The fuel distributor is oriented such that central axis of the central and end chambers extends substantially parallel to a line drawn between the ends of the fuel injectors served by that fuel distributor.

A spring interconnecting the pistons through the central chamber biases the pistons toward the central chamber, which positions close the fuel outlet. Fuel pressure within the central chamber urges the pistons against the spring biasing force to thereby open the fuel outlets. The mass of each piston is proportional to the barometric fuel height in the circuit between the fuel outlet of the end chamber containing the piston and the injector fed by fuel from the outlet.

The fuel distribution system ensures uniform fuel flow to all of the injectors in the combustion chambers, thereby avoiding local overheating of the gas turbine blades. The system is also insensitive to the load factors induced by aircraft maneuvering because the forces exerted by these load factors on the pistons of the fuel distributors are compensated by the forces exerted by the load factors on the fuel mass since the injectors are connected by crossing conduits.

Reliability of the fuel distribution system is ensured due to the annular closed loop fuel connector line to which the fuel distributors are connected in parallel. Thus, should one fuel distributor fail, another distributor will supply fuel to the fuel injector served by the failed fuel distributor. Since the system avoids the necessity of several gear pumps and their associated drive systems, it enables a weight saving in the fuel system for the aircraft.

BRIEF DESCRIPTION OF THE DRAWINGS

FIG. 1 is a schematic block diagram of a fuel circuit feeding fuel to a plurality of injectors of a gas turbine engine.

FIG. 2 is a schematic diagram of the fuel distribution system according to the invention.

FIG. 3 is a cross-sectional view of a fuel distributor according to the present invention.

DETAILED DESCRIPTION OF THE PREFERRED EMBODIMENTS

As best seen in FIG. 1, the fuel distribution system 1 according to the present invention is located in the fuel distribution circuit of a gas turbine engine upstream of the plurality of fuel injectors 2 and is supplied with fuel from a fuel feed line 3. The fuel is metered by a fuel regulation system 4 downstream of a high-pressure pump 5 which is, in turn, fed from a low-pressure pump 6 connected to the fuel supply (not shown).

FIG. 2 shows the overall configuration of the fuel distribution system 1 according to the invention in a gas turbine engine having a plurality of fuel injectors in an annular combustion chamber. Fuel injectors 2 are circumferentially arrayed around the axis 22 of the gas turbine engine so as to inject fuel into the annular combustion chamber. The fuel injectors 2 are supplied by fuel lines 7. Although four such fuel injectors are illustrated, it is to be understood that the number of fuel injectors may differ depending upon the precise structural configuration of the gas turbine engine.

The fuel feed line 3 supplies fuel to a generally annular collector line 8 formed as closed loop enclosing the combustion chamber. Fuel distributors 9 are connected to the fuel connector line 8 in parallel and are each supplied fuel from the fuel collector line 8. Again, although four fuel distributors 9 are illustrated, the number will depend upon the fuel injectors and the engine configuration.

Each fuel distributor 9 comprises a casing 10 defining an inner cavity 11 having a longitudinal axis 12, which cavity 11 comprises two end chambers, 13a and 13b interconnected by a central chamber 14. The central chamber 14 connects the two end chambers 13a and 13b, and has a diameter less than that of the end chambers 13a, 13b which may have equal diameters. The central chamber 14 communicates with the fuel connector line 8 via a conduit 15 and fuel inlet 16.

Pistons 17a and 17b are movably located within the end chambers 13a, 13b, respectively. Pistons 17a and 17b are connected to each other by a tension spring 18 which, absent any fuel pressure in the central chamber 14, pulls the pistons 17a and 17b towards each other by a force F such that the pistons bear against the edges formed at the junctures between the central chamber 14 and the end chambers 13a and 13b.

Each fuel distributor has fuel outlet orifices 19a and 19b communicating with end chambers 13a and 13b, respectively and located adjacent to the opposite ends of central chamber 14. By-pass conduits 20a and 20b connect fuel outlets 19a and 19b to zones in the end chambers 13a and 13b located farthest away from the central chamber 14. Pressures Pa and Pb exerted on the opposite sides of the pistons 13a and 13b therefore are equal to the pressures at the fuel outlets 19a and 19b.

As illustrated in FIG. 2, the axis 12 of the central chamber 14 and end chambers 13a and 13b extends substantially parallel to a line connecting the two adjacent fuel injectors 2a and 2b connected to the fuel distributor 9. The outlets 19a and 19b of a fuel distributor 9 are connected to the fuel lines 7 of the injectors 2a and 2b by crossing conduits 21a and 21b. Accordingly, each fuel injector 2 is supplied with fuel issuing from two adjacent distributors regulated by the pistons which are located farthest away from fuel injector 2 and the fuel line 7.

In order to compensate for the load factor g, the mass M of a piston 13a, 13b must be proportional to the barometric height h of the fuel in the circuit between the fuel injector 2 connected to the chamber in which the piston is located and the outlet 19a, 19b controlled by the piston.

More specifically, the mass M of a piston equals the mass Mc of the fuel in the circuit between the injector 2 and the fuel outlet controlled by the piston. Therefore $$M = Mc = Sph$$

where S is the area of the piston side subjected to the pressure in the end chamber and p is the density of the fuel. Because of this feature and because the conduits 21a and 21b are crossing conduits, the load factor g does not affect the fuel distributors 9.

Given the following definitions:

| | |
|---|---|
| F | spring bias |
| Kr | spring constant |
| Mca | fuel mass in circuit 21a |
| Mcb | fuel mass in circuit 21b |
| Po | pressure of the fuel metered into the central chamber 14 |
| Pa | pressure at outlet 19a |
| Pb | pressure at outlet 19b |
| Sa | area of piston 17a |
| Sb | area of piston 17b |
| Pc | pressure in the combustion chamber |
| K2a | flow coefficient of injector 2a |
| K2b | flow coefficient of injector 2b |
| g | disturbing acceleration |
| A | angle subtended between axis 12 and direction of disturbing acceleration |
| Xa | stroke of piston 17a |
| Xb | stroke of piston 17b |
| Ma | mass of piston 17a |
| Mb | mass of piston 17b |
| t | time | then the following equilibrium equations hold:

$$Ma\left(\frac{d^2Xa}{dt^2}\right) = Sa(Po - Pa) - Kr(Xa + Xb) - F + g(\cos A)(Mca - Ma)$$

$$Mb\left(\frac{d^2Xb}{dt^2}\right) = Sb(Po - Pb) - Kr(Xa + Xb) - F + g(\cos A)(Mcb - Mb)$$

The fuel distributor is designed such that Ma=Mca and Mb=Mcb, wherein g(cosA)(Mca−Ma)=g(cosA)(Mcb−Mb)=0 and therefore, the load factor g is not felt.

When the two pistons 17a and 17b and the tension spring 18 are in equilibrium inside the casing 10, the two equations become $$SA(Po-Pa) - Kr(Xa+Xb) - F = 0$$

$$Sb(Po-Pb) - Kr(Xa+Xb) - F = 0$$

whereby Po(Sa−Sb)=SaPa−SbPb, the diameters of the two end chambers 13a and 13b being essentially identical, Sa=Sb.

Therefore, it follows that the pressures Pa and Pb are equal even when the strokes Xa and Xb of the pistons 17a and 17b are different. Using the system according to the invention, the pressures in the conduits 21a and 21b will be identical.

If the strokes of the pistons are such that Xa+Xb=y wherein y is the elongation of the spring 18, it follows that $$y = [Sa(Po-Pa) - F]/Kr.$$

The elongation of the spring 18 depends only on the pressure difference (Po−Pa). Therefore, the flow coefficients of the outlet openings 19a and 19b, freed by the pistons 17a and 17b are variable and increase with the pressure differential (Po−Pa), thereby limiting the pressure drop of the distributor 9 at high fuel flows.

As noted previously, the fuel distributors 9 are mounted on a close loop fuel supply connector line such that a given fuel injector is supplied by two fuel flows from separate fuel distributors.

The equation $$Q2a = Qa + Q3 = K2a\sqrt{(Pa - Pc)}$$

applies to the fuel injector 2a where Qa is the flow through conduit 21 and Q3 is the fuel flow from another fuel distributor.

Similarly, the equation $$Q2b = Qb + Q4 = K2a\sqrt{(Pa - Pc)}$$

applies to the fuel injector 2b.

Since the injectors 2a and 2b are identical, the flow coefficients K2a and K2b are also identical.

Therefore, it follows from the equilibrium condition Pa=Pb that $$Qa + Q3 = Qb + Q4.$$

The fuel flows of the injectors 2a and 2b are identical even when the fuel flows Qa, Qb, Q3 and Q4 are different, which may occur if a piston or fuel distributor fails. As can be seen, the fuel distribution system according to the invention ensures uniform fuel flows to the various fuel injectors and is insensitive to the load factors induced thereon by maneuvering of the aircraft. This system can also be supplied with low-pressure fuel whereby a saving in equipment weight is made possible.

The foregoing description is provided for illustrative purposes only and should not be construed as in any way limiting this invention, the scope of which is defined solely by the appended claims.

I claim:

1. A fuel distribution system for a gas turbine engine having a plurality of fuel injectors arranged in an annular array and a fuel feed line, the system comprising:
   a) a closed loop fuel connection line in fluid communication with the fuel feed line;
   b) a plurality of fuel distributors, each fuel distributor comprising:
      i) a casing defining a first and second end chambers in communication with a central chamber, the chambers having a common axis;
      ii) a fuel inlet connected to the fuel connection line allowing fuel to flow from the fuel connection line into the central chamber;
      iii) a first fuel outlet communicating with the first end chamber;
      iv) a second fuel outlet communicating with the second end chamber;
      v) first and second pistons movably located in the first and second end chambers, respectively, such that movement of the pistons controls the opening and closing of the first and second fuel outlets, respectively, and;
      vi) biasing means acting on the first and second pistons so as to urge the pistons toward the central chamber in opposition to forces acting on the pistons caused by fuel in the central chamber;
   c) a first crossing conduit in fluid communication with the first fuel outlet of a first fuel distributor, a fuel outlet of another fuel distributor, and a first fuel injector; and
   d) a second crossing conduit in fluid communication with the second fuel outlet of the first fuel distributor, a fuel outlet of another fuel distributor and a second fuel injector, whereby each fuel distributor is oriented such that the common axis extends generally parallel to a line extending between the two fuel injectors to which the fuel distributor is fluidly connected.

2. The fuel distribution system of claim 1 wherein the biasing means comprises a tension spring extending through the central chamber and connected to the first and second pistons.

3. The fuel distribution system of claim 1 wherein the mass of a piston in an end chamber is proportional to the barometric height of fuel contained in the system between the end chamber in which the piston is located and the fuel injection fluidly connected to the end chamber.

4. The fuel distribution system of claim 1 wherein the closed loop fuel connection line is generally annular in configuration.

5. The fuel distribution system of claim 1 wherein the first and second end chambers have substantially equal cross-sectional areas.

6. The fuel distribution system of claim 5 wherein the cross-sectional area of the central chamber is less than the cross-sectional area of the first and second end chambers.

* * * * *